United States Patent [19]

Klank

[11] 4,347,538

[45] Aug. 31, 1982

[54] METHOD AND APPARATUS FOR THE MEASUREMENT AND INDICATION OF THE POSITION OF A COILED MATERIAL IN TAPE FORM

[75] Inventor: Otto Klank, Arpke, Fed. Rep. of Germany

[73] Assignee: Licentia Patent-Verwaltungs-GmbH, Frankfurt am Main, Fed. Rep. of Germany

[21] Appl. No.: 129,379

[22] PCT Filed: Dec. 6, 1978

[86] PCT No.: PCT/DE78/00037

§ 371 Date: Aug. 6, 1979

§ 102(e) Date: Aug. 6, 1979

[87] PCT Pub. No.: WO79/00352

PCT Pub. Date: Jun. 28, 1979

[30] Foreign Application Priority Data

Dec. 7, 1977 [DE] Fed. Rep. of Germany ....... 2754368

[51] Int. Cl.³ ............................................. G11B 27/10
[52] U.S. Cl. ................................... 360/137; 360/74.2; 360/72.3; 360/96.3; 242/75.51; 318/7
[58] Field of Search .................. 360/137, 71, 73, 74.2, 360/72.3, 72.1, 96.3, 31; 242/186, 191, 75.51; 318/7; 364/705

[56] References Cited

U.S. PATENT DOCUMENTS 3,824,694 7/1974 Lesperance ........................... 33/141
4,172,231 10/1979 Costemore et al. ................ 360/72.3

FOREIGN PATENT DOCUMENTS 822011   5/1975  Belgium ............................. 360/72.3
855968  10/1977  Belgium ............................. 360/72.3
1265992  4/1968  Fed. Rep. of Germany ..... 360/72.3
2416060 10/1975  Fed. Rep. of Germany ..... 360/72.3
2425856 12/1975  Fed. Rep. of Germany ..... 360/72.3
2449565  4/1976  Fed. Rep. of Germany ..... 360/72.3
2746613  5/1978  Fed. Rep. of Germany ..... 360/72.3

OTHER PUBLICATIONS

Funkshau, 1975 vol. 47, No. 20, Scholz, Automatization of a Cassette Recorder.

Primary Examiner—Bernard Konick
Assistant Examiner—Alan Faber
Attorney, Agent, or Firm—Spencer & Kaye

[57] ABSTRACT

The position of the tape in a magnetic tape recorder is obtained by counting the pulses derived from the revolutions of a reel or spool. The ratio of the number of revolutions per minute of the reels and the total number of turns is determined by means of a test run; the counting process is linearized by means of these values.

14 Claims, 7 Drawing Figures

METHOD AND APPARATUS FOR THE MEASUREMENT AND INDICATION OF THE POSITION OF A COILED MATERIAL IN TAPE FORM

BACKGROUND OF THE INVENTION

The position or setting of tapes in magnetic tape recorders can be determined by the counting of pulses which are derived from a part moving together with the magnetic tape such as, for example, the spindles. The number counted may be employed for indicating the tape setting. Since the length of the circumference of a tape reel varies with the coiling or uncoiling of the magnetic tapes this indication is not linear. That is, considerably varying values are obtained for the tape section assigned to individual counting steps as a function of the tape setting.

With a view towards improving the linearity of indication it has been proposed (German Auslegeschrift No. 24 16 060.9) to provide a scanning unit on each of the two spindles, to derive tape travelling pulses from the scanning units and to feed the sum of the pulses into a counter. While this method effects some improvement in indication it is in some cases still inadequate in effecting an improvement in linearity such as, for example, when the indication has to be calibrated to the length of tape which has been run dimensionally.

SUMMARY OF THE INVENTION

An object of the invention is to provide a method for indicating the tape setting which is greatly improved with respect to linearity as a result of which it becomes possible to perform an absolute calibration in meters or seconds.

In the course of the determination of the tape setting in a magnetic tape recorder by means of the counting of pulses derived typically from the take-up spindle; the changing reel diameters during the coiling operation produce a non-linear counting result over the tape length. In commercially available magnetic tape cassettes the length of play of a given cassette is a function of the tape length and different thickness tapes are used as a function of the tape length.

The invention is based on the finding that the variables affecting the winding operation which have to be allowed in the linearisation of the counting operation can be expressed by two values which can be easily determined during a test run of the magnetic tape recorder concerned. These are 1. The ratio of the diameter of the fully wound reel to the diameter of the empty hub of a reel and
2. The total number of turns (winding number) of a full reel.

One series of pulses each is derived from each of the two spindles for the detection of these values. The first value is determined by a frequency comparison of the pulse series during a test run from the starting setting of the magnetic tape at which the take-up reel is empty and the take-off reel is full. The second value is derived by a count of the pulses making up one of the pulse series over the full tape length or a part of the tape length. In the described embodiment the pulses are counted by the take-up spindle.

Assuming that the diameters of the hubs of the take-up and take-off reels are identical the tape setting can be derived with these values by means of the following formula $$L = D_o \left( N_1 + \frac{a-1}{2} \frac{N_1^2}{N_{1ges}} \right)$$

The various symbols in this formula have the following meanings: L is the tape setting, a figure which varies linearly with the length of tape delivered which figure may be indicated (reported) through application of an appropriate factor in a length unit, for example meters, or in a timeunit such as minutes. $D_0$ is the diameter of the hubs of the reels, $N_1$ the appropriate number of turns on the take-up reel, $N_{1ges}$ the possible total number of turns, and a the frequency ratio of the pulse series derived from the take-up and take-off reels at the start of the winding process.

DESCRIPTION OF A PREFERRED EMBODIMENT

Figure 1:
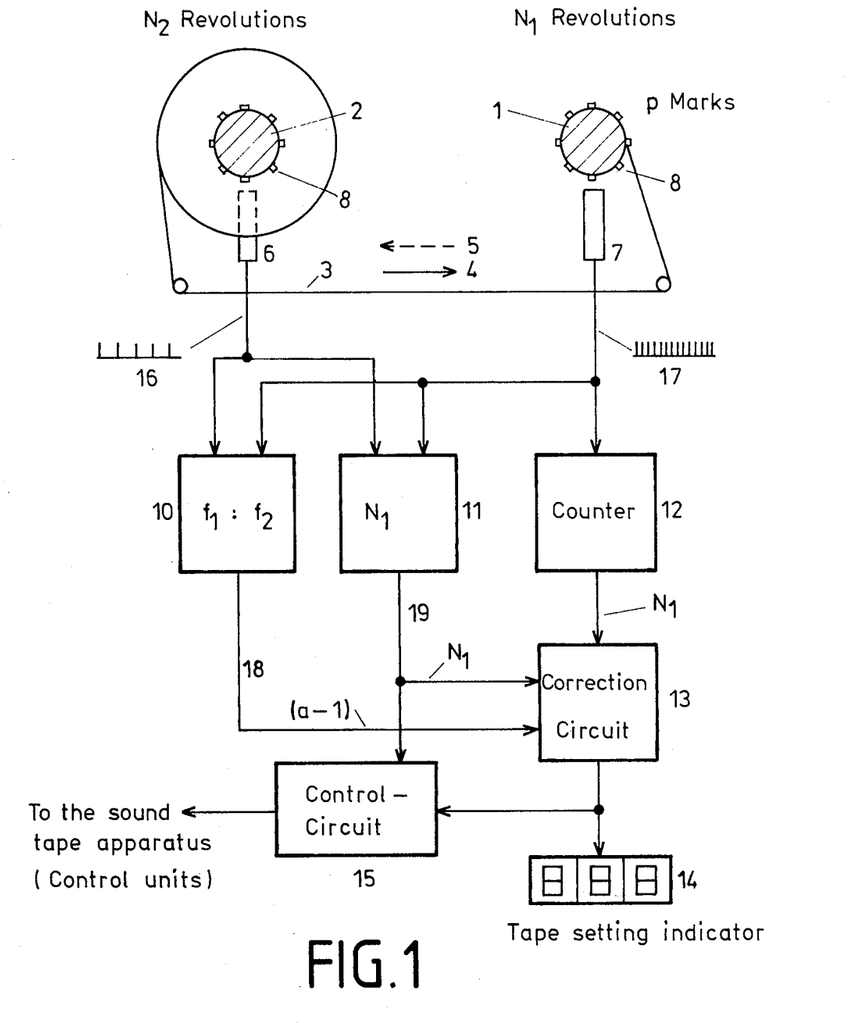
FIG. 1 is a block circuit diagram of the invention.

FIG. 1 shows part of a magnetic tape cassette apparatus with two spindles 1 and 2 between which a magnetic tape 3 can be arbitrarily moved to and fro. The diagram only shows the outer circumferences of the magnetic tape reels which change with the tape setting or position. In the illustrated case the reel on the left is fully wound and the reel on the right is empty. Pulses are generated through the travel of the tape. Marks 8 are provided for this purpose on the spindles 1 and 2 or some other part moving in unison with the reels such as the drive shaft for the spindles 1 and 2. Pulse pick-ups 6 and 7 are provided for scanning these marks 8. At the outputs of the pulse pick-ups 6 and 7 arise pulse series 16 and 17 respectively when the magnetic tape is running. At the indicated tape setting the pulse series 16 has the lowest occurring pulse repetition frequency and the pulse series 17 the the highest occurring pulse repetition frequency because the circumferences of the reels have in one case the largest and in the other case the smallest occurring diameter.

The pulse pick-up 7 is wired to a counter 12 in which the pulses 17 are counted commencing from the beginning of the tape. Since the frequency of the pulse series 17 varies with the length of tape moved the counter setting does not vary linearly with the tape position. A correction is therefore applied to the counting result in a correction circuit 13. The corrected counting result from the output of the correction circuit is indicated in an indicating unit 14 and is transmitted to a control circuit 15. This control circuit 15 is employed for the control of the functions of the magnetic tape recording apparatus, it thus being possible to provide an automatic setting facility to a desired tape setting which is introduced through an input keyboard. In such an automatic setting run the read-in desired tape setting is compared against the actually determined value. The travel of the magnetic tape is controlled so that the two values are made to coincide. Appropriate circuits for this are already known.

A mathematical correction calculation in accordance with the aforesaid formula based on the geometrical laws of the tape reeling process is carried out in the correction circuit 13. In this context L is the measuring result giving the tape setting available at the output of the correction circuit 13, and $N_1$ is the counter setting of the counter 12 corresponding to the number of revolutions of the spindle 1. $N_{1ges}$ is the number of turns of a full magnetic tape reel; that is, a reel which has been fully loaded with tape. The variable $a-1$ included in the formula is determined in the case of the circuit per FIG. 1 in block 10. A test run of the magnetic tape is made from the indicated starting setting to determine and store in block 10 the frequency ratio of the pulse series 16 and 17 and this is fed through a lead 18 to the correction circuit 13. From a run through of the magnetic tape is determined and stored the variable $N_{1ges}$ in the block 11 and this is passed from there through the lead 19 to the correction circuit 13. The total number of turns $N_{1ges}$ may also be determined by a run up to the middle of the magnetic tape, in which case the sameness of the frequencies of the pulse series 16 and 17 can be employed as a switching-off criterion.

$N_{1ges}$ and a are two values which clearly designate the magnetic tape cassette employed and are therefore determined once after the insertion of a cassette or after switching on the apparatus and are stored for as long as an apparatus uses this magnetic tape. In order to obtain a linear tape setting indication it is therefore necessary to first carry out the described procedure in which the values of $N_{1ges}$ and a are determined while the magnetic tape is running.

Figure 2:
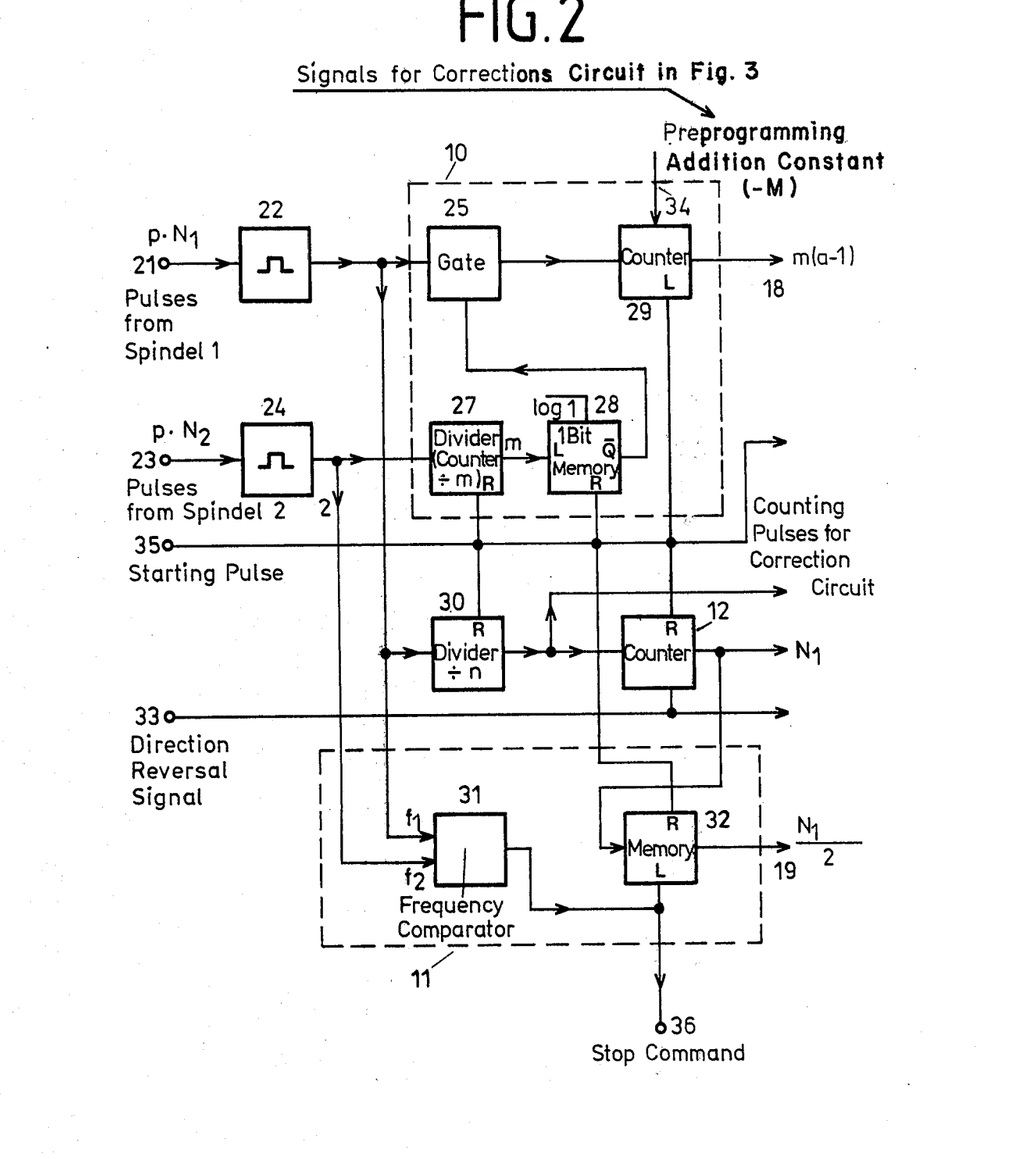
FIGS. 2 and 3 are circuit units relating to the circuit of FIG. 1.

FIG. 2 is an example of an embodiment of the circuits of the blocks 10, 11 and 12 described in connection with FIG. 1. The pulses from the spindles of the magnetic tape recorder are fed through input terminals 21 and 23 to pulse forming circuits 22 and 24. The block 10 comprises a preprogrammable counter 29. An addition constant $-m$ applied to an input 34 of the counter 29 is introduced into the counter 29 through a starting pulse at the input L of the counter 29. The pulses from the spindles 1 are fed to the input of counter 29 through a gate 25. The gate 25 is open for the time of m pulses coming from the spindle 2. A counter 27 and a 1-memory 28 are provided for the control of the gate 25. The counter 27 is brought to its starting setting by the already previously mentioned starting pulse which brings the 1-bit memory 28 into a state at which the logic state "1" exists at the output $\overline{Q}$. The gate 25 is controlled with the output signal from the 1-bit memory 28. The gate 25 may, for example, be in the form of an AND-gate with two inputs, whereby the pulses are fed into one input and the other input is connected with the output of the 1-bit memory 28. On occurrence of the starting pulse at the input terminal 35 into the entire circuit the gate 25 is opened and is closed again after the receipt of m pulses from the spindle 2 because then the memory 28 takes over a logic "1" corresponding to "0" at the output $\overline{Q}$. After this opening time the setting of the counter 29 is m $(a-1)$ whereby a is the frequency ratio of the pulse series 17 derived from the spindle 1 in FIG. 1 and the pulse series 16 derived from the spindle 2. When the value m is a dual number, and the divider 27 is hence a dual divider (m) this value can be easily eliminated through division by a numeral value m corresponding to a place shift (comma shift). The counter setting of the counter 29 is transmitted through the lead 18 to a yet be described correction circuit 13 in FIG. 1.

The pulses from the spindle 1 are passed via a divider 30 with the dividing ratio of 1:n to the input of the counter 12. For the improvement of the accuracy of the values determined in block 10 the number of pulses derived from the spindle is selected to have so large a value that only every nth pulse need be counted in the counter 12. On the assumption that the dividing factor n corresponds to the number of marks p on the spindles the setting of the counter 12 will just indicate the number of revolutions $N_1$ of the spindle.

Block 11 comprises a frequency comparator 31 and a memory 32. The number of memory steps of the memory 32 equals the number of counting steps of the counter 12. The output of the counter 12 is connected with the input into the memory 32. The memory 32 together with the counter 12 are erased by the starting pulse at the input terminal 35 of the circuit. The counter setting of the counter 12 can be transferred into the memory 32 through a loading pulse at the input L of the memory 32. The input L of the memory 32 is connected with the output of the frequency comparator 31. At the input of the frequency comparator are applied the frequencies $f_1$ and $f_2$ of the pulse series derived from the spindles. The frequencies $f_1$ and $f_2$ are equal when the reel diameters are of equal magnitude indicating that the middle of the tape has been reached. At this point a loading signal is put into the input L into the memory 32. This loading signal causes the reading in and storage in the memory 32 of the counter setting of the counter 12 which equals exactly half of the maximum total number of turns $(N_{1ges})/2$. The reading in of the counter setting into the memory 32 completes the storage of all values needed for the correction of the tape setting indication. The loading signal at the input L of the memory 32 serves therefore at the same time as a stop command for the control circuit 15 in FIG. 1. It can be taken off the output terminal 36. The starting pulse at the input 35 is generated only once when a new cassette is inserted or the apparatus is switched on. The starting signal may be typically triggered off by the insertion of a cassette.

After the test run of the magnetic tape recorder has been completed it is possible to run the counter 12 arbitrarily forwards and backwards as a function of the direction of travel of the magnetic tape. During the backwards travel the counter 12 receives on one input Abw through an input terminal 33 an opposite direction information signal from the control circuit designated by 15 in FIG. 1 as a result of which the direction of counting of the counter 12 is reversed.

When the tape setting indicator has to be returned to zero at a given point in time, e.g. at the start of the tape, after the test run has been completed, it is only the counters 12 and 48 (FIG. 3) but not the counters 29 and the memory 32 which may be reset. The stored values would otherwise be lost. The resetting may be effected through additional reset inputs of the counters 12 and 48 through a signal which differs from the starting pulse.

Figure 3:
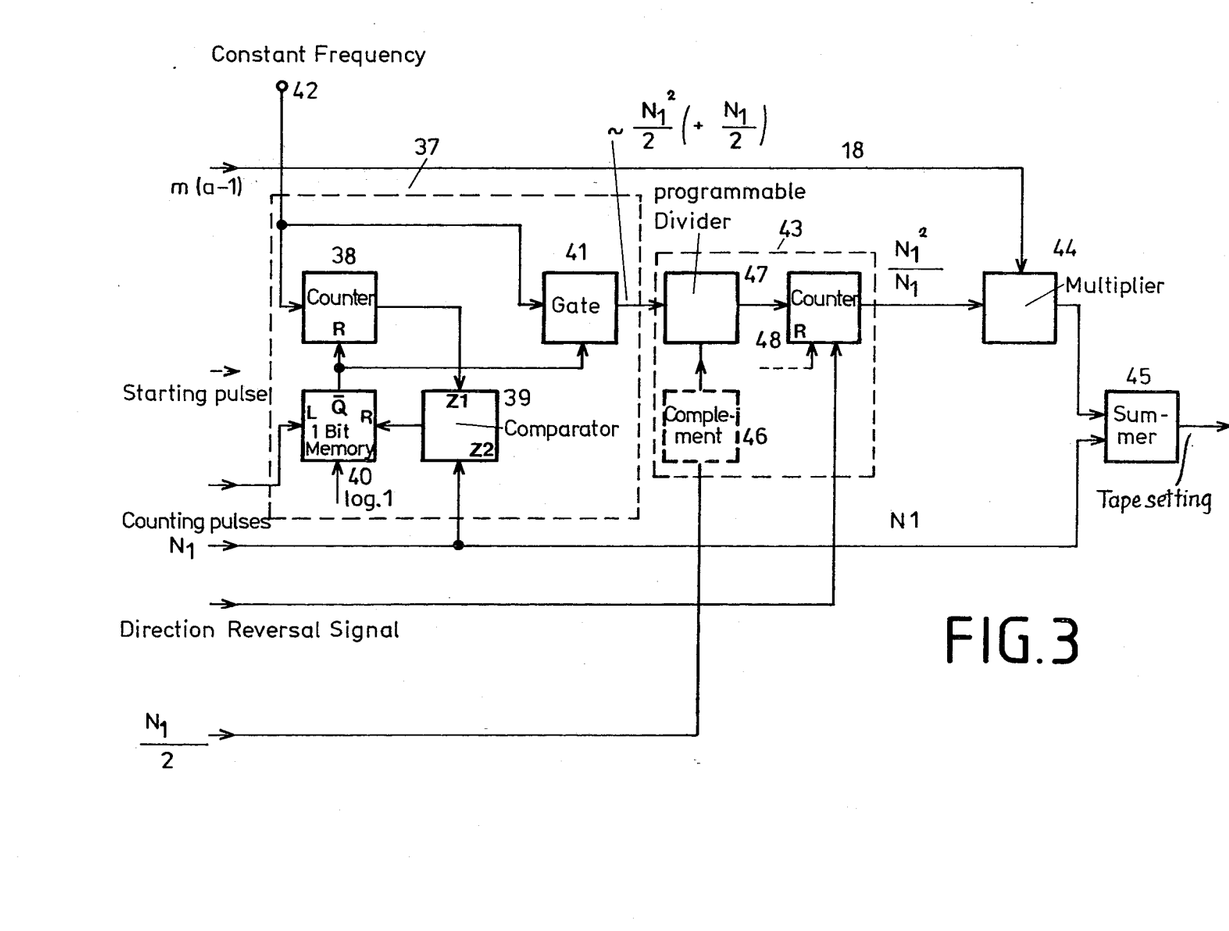

The signals shown in FIG. 2 on the right hand margin are transferred to the correction circuit (13 in FIG. 1) shown in FIG. 3.

The correction circuit comprises a circuit 37 for the squaring of the counting pulses at the input of the counter 12 in FIG. 2, also a dividing circuit 43 for dividing by the value $N_{1ges}$, a multiplier 44 for the multiplication with the value $a-1$ and a summer 45 for adding the value $N_1$ to the output of multiplier 44.

The squaring circuit 37 comprises a 1-bit memory 40, a counter 38, a comparator 39 and a gate 41. A signal with a constant relatively high frequency of typically 1 MHz is fed from an oscillator, not shown, through an input terminal 42 to the counter 38 and the input of the gate 41. The output $\overline{Q}$ of the 1-bit memory 40 is wired to the reset input R of the counter 38. The input Z1 of the comparator 39 is wired to the output of the counter 38 and the output of the counter 12 in FIG. 2 is connected with another input Z2 of the comparator 39. The counting pulses are fed to the loading input L of the memory 40. The output of the comparator 39 is wired to the reset input R of the memory 40. The logic state "1" is transferred into the memory 40 on occurrence of a counting pulse so that a signal "0" is available at its output $\overline{Q}$. As a result of the connection of the output $\overline{Q}$ with the reset input R of the counter 38 this latter counter 38 is thereby switched to be ready for counting. Through a connection from the output $\overline{Q}$ of the memory 40 to the gate 41 the gate 41 is opened simultaneously so that the constant frequency pulses are allowed to pass through the gate 41. When the counter setting of the counter 38 is the same as the counter setting $N_1$ of the counter 12 in FIG. 2 a reset signal is passed from the comparator 39 to the reset input R of the memory 40. The counter 38 is as a result reset and the gate 41 is closed. The described procedure is started anew by the next counting pulse at the input L of the memory 40.

The number of constant frequency pulses allowed by the gate 41 to pass at every counting pulse increases with the increase of the counter setting $N_1$ of the counter 12. At the output of the gate 41 appear pulse stacks, the number of pulses of which increases linearly with the value $N_1$. The pulses are counted in a counter 48 in block 43. The result of the count corresponds to the sum formula of an arithmetic series as follows:

$$=N_1\cdot(1+N_1/2)=N_1/2+N_1^2/2$$

Since the square portion ($N_1^2/2$) predominates it is possible to disregard the portion $N_1/2$.

On the supply side of the counter 48 is inserted a programmable divider 47 the programming input of which is connected with the output of the memory 32 in FIG. 2. A circuit 46 for forming the complement of the value held in memory 32 may be inserted depending on the configuration of the programmable divider 47 employed.

The dividing ratio of the programmable divider 47 is determined by the value $N_{1ges}/2$. The pulse number is divided in this way so that the counter setting of the counter 48 gives the value $N_1^2/N_{1ges}$.

The output of the counter 48 is wired to the input of the multiplier 44. The other input is wired through the lead 18 to the output of the counter 29 in FIG. 2. The output of the multiplier 44 is wired to the input of the summer 45. The other input of the summer 45 is at the output of the counter 12 in FIG. 2. At the output of the summer 45 appears a value which varies linearly with the length of tape passed and which is employed for the tape setting indication and control of FIG. 1.

Corresponding to the counter 12 in FIG. 2 the counter 48 in block 43 is reset by the previously mentioned starting pulse into its starting setting and its direction of counting can be reversed by the previously referred to direction reversed signal. The circuit blocks used in FIGS. 2 and 3 are prior art type standard modules employed in digital computer engineering. The multiplier 44 may typically consist of the prior art integrated circuits SN 74284 made by Texas Instruments and the summer 45 may consist of the integrated circuit SN 74283 made by the same manufacturer. These must always be used in cascade arrangement.

The above described circuit is an example of an embodiment for the carrying out of the method in accordance with the invention. The circuit may be varied in many ways without thereby changing the method for determining the tape setting. The multiplier 44 in FIG. 4 for example may be replaced by a programmable divider which is placed on the input side of the counter 48. The value $(a-1)$ would then have to be replaced by its reciprocal $1/(a-1)$ which would be fed into the programmable divider. This reciprocal may be obtained by reversing the two input signals of circuit 10.

In the case of the circuit per FIGS. 2 and 3 it is necessary to first restore the magnetic tape into its starting setting after completion of the test run for the determination of the values a and $N_{1ges}$. On standard playing operation of the magnetic tape apparatus a new count is then started which will be subject to the correction controlled by the stored values. Normal operation cannot be started from the setting at which the test run was completed because counting in the counter 48 (FIG. 3) depends upon the value $N_{1ges}$. This value is not yet available during the test run.

Figure 4:
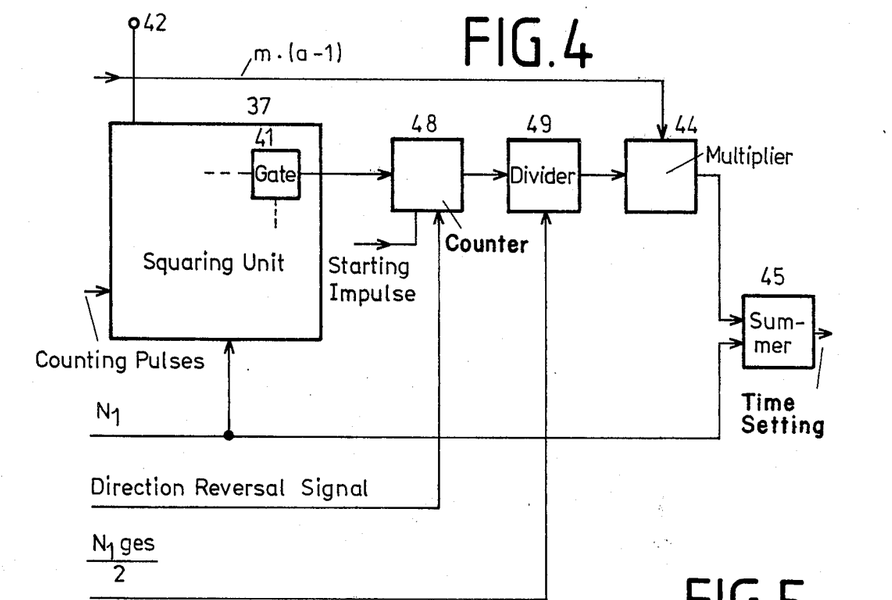
FIG. 4 is a variant of the circuit of FIG. 3.

FIG. 4 shows a circuit which is varied from the circuit of FIG. 3 in that it is possible to take up normal operation directly after the test run. All parts in this circuit corresponding to parts in the circuit of FIG. 3 bear the same reference symbols. The pulses coming forward from the gate 41 in the square-law transfer element 37 are first counted in the counter 48' and are only then divided by the value $N_{1ges}/2$ in the divider 49. The content of the counter 48 is a result not dependent upon the values determined during the test run, so that the correction may be still applied after completion of the test run. This circuit corresponds in all other respects to the circuit of FIG. 3. The divider may be made up of a combination of prior art integrated circuits in accordance with page 235 in the "TTL" cookery book" published by Texas Instrument, 1973.

The divider 49, the multiplier 44 and the summer 45 in FIG. 4 may be combined into a calucating register. This also applies to the blocks 44 and 45 in FIG. 3. The square-law transfer element 37 could also be included in such registers. In the case of the circuit of FIG. 4 it is also possible to start the test run from the middle of the tape. In this the magnetic tape is first brought into this setting in which case the stop command is taken from the comparator 31. The value $N_{1ges}/2$ is determined by a test run to the beginning or end of the magnetic tape and followed by the determination of the value a at the end or the beginning of the magnetic tape.

The method explained with the aid of FIGS. 1 to 4 greatly improves the linearity of the tape setting indication. The tape setting can be indicated either directly in meters (tape length) or in minutes (the playing time corresponding to the tape length). In the latter case there exists the advantage that the length of a recorded piece can be directly read off from the readings of the start and end of this piece.

The above described circuit for the implementation of the method is beneficially made in the form of an integrated circuit.

Figure 5:
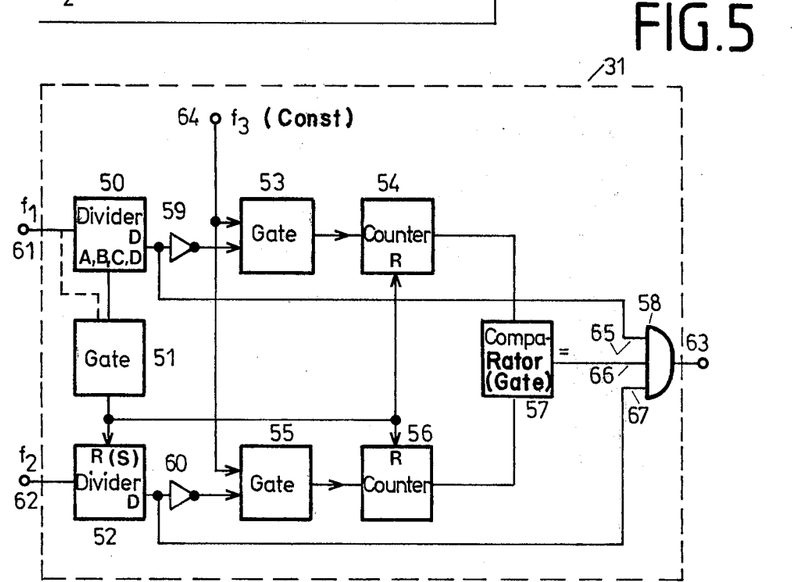
FIG. 5 is an embodiment of a frequency comparator provided in the circuit of FIG. 2.

The frequency comparator 31 in FIG. 2 must be suitable for the comparison of low frequencies. It is therefore advantageous to conduct a comparison of the two pulse series which extends over several periods. FIG. 5 shows a suitable circuit for this which will be described in the following. The pulse series (16 and 17 in FIG. 1) with the frequencies $f_1$ and $f_2$ derived from the spindles are fed in through input terminals 61 and 62. The pulses with the frequency $f_1$ are fed in to the input of a BCD divider 50 and pulses with the frequency $f_2$ into the input of an identical divider 52. The four outputs from the BCD divider are designated A, B, C and D. At the output D of the dividers 50 and 52 the logical signal "0" appears during the settings zero to seven of the dividers 50 and 52. From the output D of the divider 50 is triggered through an inverter 59 a gate 53 and correspondingly from the divider 52 through an inverter 60 a gate 55. The gates 53 and 55 are, for example, designed in the form of and gates with two inputs. The output of the inverters 59 and 60 are connected with the respective control inputs of the relevant gates. A pulse signal with a constant frequency $f_3$ occurring at an input terminal 64 is fed to the other inputs of the gates 53 and 55. The output of the gate 53 is wired to the counting input of a counter 54 and the output of the gate 55 to the counting input of a counter 56.

The outputs of the counters 54 and 56 are wired to the comparison inputs of a comparator 57. At the output of the comparator 57 appears the logical signal "1" when the counter settings of the counters 54 and 56 are equal. Excepted from this are however the counter setting of zero. Such a comparator 57 can be easily built up from logical gates. The output of the comparator 57 and the outputs D of the dividers 50 and 52 are linked through an AND-gate 58. The output of the AND-gate 58 is wired to an output terminal 63 which forms the output of the frequency comparator 31. A gate 51 is connected to the outputs A, B, C and D of the divider 50 so that the logical signal "1" is given off at the output of the gate 51 when the countersetting of the divider 50 is nine. A connection shown as a broken line between the gate 51 and the input of the divider 50 assures that the logical state at the output of the gate is obtained directly upon the reaching of the counter setting nine and only for the duration of the ninth pulse. The pulse produced at the output of the gate 51 is designated in the following by the term "reset pulse". The gate 51 may, for example, be in the form of an AND-gate with three inputs of which one input is connected with the output A, another with the output D and the third input with the input of the divider 50. The output of the gate 51 is connected with a setting input of the divider 52 with which the divider 52 can be changed into the setting nine and is also connected with reset inputs R of the counters 54 and 56.

The circuit works as follows: Let it be assumed that the starting setting of the dividers 50 and 52 is nine. From the spindle 1 (see FIG. 1 and 3) pulses are counted into the divider 50 through the input terminal 61. The gate 53 is first opened so that pulses with constant frequency $f_3$ can be counted into the counter 54. The gate 53 is closed with the ninth counting pulse of the divider 50. The setting of the counter 54 after the closing of the gate 53 represents the duration of 8 periods of frequency $f_1$.

Nine pulses are correspondingly counted in from the spindle 2 through the input terminal 62 into the divider 52. The gate 55 is again open for the duration of eight counting pulses of the divider 53. The counter setting on the counter 56 achieved after this time represents the length of 8 periods with the frequency $f_2$ derived from the spindle 2. The frequencies $f_1$ and $f_2$ will coincide when the counter settings of the counters 54 and 56 are the same after a counting period. In this case there appears at the output terminal 63 the logic signal "1" since all inputs of the AND gate 58 are set at logic "1". The frequency $f_3$ is, for example, 100 KHz. The magnitude of the frequency governs the accuracy of the frequency comparator. On attainment of the setting nine by the divider 50 the divider 52 will be set into its starting setting nine by the previously mentioned reset pulse. The counters 54 and 56 are reset at the same time too. The described counting process starts afresh. It is continuously periodically repeated.

Figure 6:
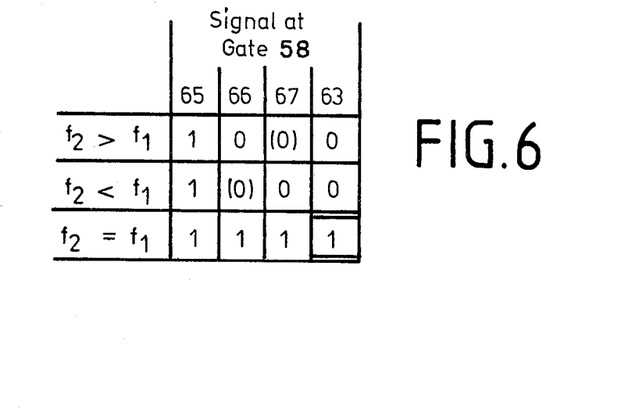
FIG. 6 is a table relating to the circuit of FIG. 5.

FIG. 6 shows a table, which gives the logical signals at the inputs and the outputs of the AND-gate 58 at various relationships of the frequencies $f_1$ and $f_2$ to one another. All inputs of the AND-gate 58 are in the logical state "1" only in the event of frequency sameness. The signals shown in brackets apply to an example shown in FIG. 7. They may however also adopt the contrary logical state under certain conditions.

Figure 7:
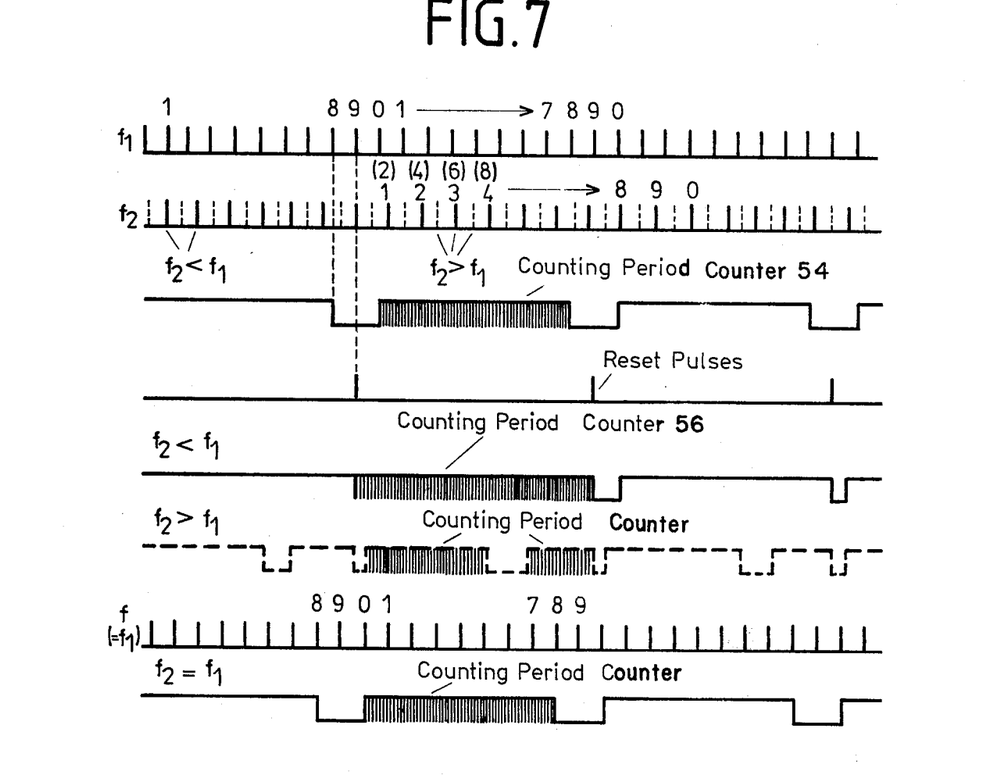
FIG. 7 shows pulse diagrams relating to the circuit of FIG. 5.

FIG. 7 shows a pulse diagram for the circuit of FIG. 5. The first two rows show the pulse series with frequencies $f_1$ and $f_2$. Below these are shown the counting periods of the counter 54 which reach from the setting zero to the setting eight of the divider 50. The reset pulses for resetting the divider 52 and the counters 54 and 56 shown in the fourth row are generated with the ninth pulse of the pulse series $f_1$. The counting time of the counter 56 is for both possible cases of frequency sameness greater than the counting period of the counter 54, as can be seen from the next two rows. In the case of frequency sameness in the bottom line of FIG. 7 the counting period of the counter 56 equals exactly that of counter 54. This means, that the counters 54 and 56 count equal numbers of pulses of frequency $f_3$ and that the logical signal "1" occurs at the comparator 57.

The counting capacity of the dividers 50 and 52 is advantageously picked to correspond with the number of marks or a whole number multiple of the number of marks so that the start and end of the counting periods of the counter 54 and 56 are always determined by the same marking. This effects compensation of the tolerances in the gaps between the marks.

It is possible to block the gates 53 and 55 during several intermediate states of the divider 50 to permit reducing of the counting capacity of the counters 54 and 56. This could be typically done from state two until state six. Only the differences at the begin and the end of the counting periods will in this case be detected. The parts of no importance for the comparison is blanked out.

The circuit described with the aid of FIG. 5 represents a specific example. The circuit can be adapted in detail to the requirements given by the application case. It is, for example, possible to pick the counting capacity of the dividers 50 and 52 and of the counters 54 and 56 differently. It is also possible to vary the periodic course of the function, for example, by a different wiring of the gate 51.

The described method may also be employed for other wound material in tape form such as films which are moved between two reels.

I claim:

1. Apparatus for indicating the position of a tape wound on first and second reels and movable therebetween, comprising:
   pulse generating means coupled to said first and second reels for generating first and second pulse trains having pulse repetition frequencies corresponding to the angular speeds of said first and second reels, respectively;
   frequency ratio means for determining the ratio a of the pulse repetition frequency of said first pulse train to the pulse repetition frequency of said second pulse train, said determination being made when one of said reels has substantially no tape wound thereon;
   turns counting means for determining the maximum total number of turns $N_{1ges}$ of tape on one of said reels when said reel is completely loaded;
   pulse counting means coupled to said pulse generating means for counting the number of accumulated pulses $N_1$ in said first pulse train starting from the beginning of the winding of said tape on said first reel; and
   correction circuit means coupled to the outputs of said frequency ratio means, turns counting means and pulse counting means, the output of said correction circuit means corresponding to the position L of the tape on said first reel.

2. Apparatus as defined by claim 1 wherein the diameters of the hubs of said first and second reels are equal, and wherein said ratio a, total number of turns $N_{1ges}$ and the number of accumulated pulses $N_1$ are related by the formula $$L = k \cdot \left( N_1 + \frac{a-1}{2} \cdot \frac{N_1^2}{N_{1ges}} \right),$$

where k is a constant calibration factor.

3. Apparatus as defined by claim 1 wherein said frequency ratio means comprises:
   a presettable first counter having an input and an output;
   a controllable gate having an input terminal coupled to said pulse generating means to receive one of said first and second pulse trains, an output coupled to the input of said first counter, and a control input; and
   a second counter having an input terminal coupled to said pulse generating means to receive the other of said first and second pulse trains and an output coupled to the control input of said gate, said gate being open for settings between 0 and a value m of said second counter, said first counter being presettable to said value m, and said first and second counters being preset and reset, respectively, by a starting pulse applied thereto.

4. Apparatus as defined by claim 1 wherein said turns counting means comprises:
   a memory circuit having a first input coupled to the output of said pulse counting means, said memory circuit having a number of storage steps corresponding to the number of counting steps of said pulse counting means;
   a frequency comparator having a first input terminal coupled to said pulse generating means to receive one of said first and second pulse trains and a second input terminal coupled to said pulse generating means to receive the other of said first and second pulse trains, the output of said frequency comparator being coupled to a second input terminal of said memory, said memory circuit initiating storage of the output of said pulse counting means when the frequencies of the first and second pulse trains applied to the first and second input terminals of said frequency comparator are equal; and
   means for applying a starting pulse to said pulse counting means and said memory circuit for erasing the contents thereof.

5. Apparatus as defined by claim 4 wherein said correction circuit means includes a squaring circuit comprising:
   a counter having a first input adapted for coupling to a constant frequency pulse source;
   a comparator having a first input coupled to the output of said counter and a second input coupled to the output of said pulse counting means;
   a 1-bit memory having a first input for receiving counting pulses and a second input coupled to the output of said comparator, said 1-bit memory having an output coupled to a second input of said counter for the resetting thereof; and
   a gate having an output, a first input adapted for coupling to said constant frequency pulse source and a second input coupled to the output of said 1-bit memory, said counter being reset by the output of said 1-bit memory and said gate closed when the signals applied to the first and second inputs of said comparator are the same, an output corresponding to the square of the pulse numbers of the counting pulse applied to the first input of said 1-bit memory being generated at the output of said gate.

6. Apparatus as defined by claim 5 which further comprises:
   a programmable divider having a first input coupled to the output of said gate and a second input coupled to the output of said memory circuit; and
   a second counter coupled to the output of said programmable divider.

7. Apparatus as defined by claim 6 wherein said pulse counting means and said second counter are reversible with respect to the direction of travel of said tape.

8. Apparatus as defined by claim 5 which further comprises:
   a second counter having an input coupled to the output of said gate; and
   a dividing circuit having a dividend input coupled to the output of said second counter and a divisor input coupled to the output of said memory circuit.

9. Apparatus as defined by claim 1 wherein said correction circuit means includes a squaring circuit comprising:
   a counter having a first input adapted for coupling to a constant frequency pulse source;
   a comparator having a first input coupled to the output of said counter and a second input coupled to the output of said pulse counting means;
   a 1-bit memory having a first input for receiving counting pulses and a second input coupled to the output of said comparator, said 1-bit memory having an output coupled to a second input of said counter for the resetting thereof; and a gate having an output, a first input adapted for coupling to said constant frequency pulse source and a second input coupled to the output of said 1-bit memory, said counter being reset by the output of said 1-bit memory and said gate closed when the signals applied to the first and second inputs of said comparator are the same, an output corresponding to the square of the pulse numbers of the counting pulse applied to the first input of said 1-bit memory being generated at the output of said gate.

10. Apparatus as defined by claim 1 wherein said frequency ratio means comprises:
a presettable first counter having an input and an output;
a controllable gate having an input terminal coupled to said pulse generating means to receive one of said first and second pulse trains, an output coupled to the input of said first counter and a control input; and
a second counter having an input terminal coupled to said pulse generating means to receive the other of said first and second pulse trains and an output coupled to the control input of said gate, said gate being open for settings between 0 and a value m of said second counter, said first counter being presettable to a value m, and said first and second counters being preset and reset, respectively, by a starting pulse applied thereto, and wherein said turns counting means comprises:
a memory circuit having a first input coupled to the output of said pulse counting means, said memory circuit having a number of storage steps corresponding to the number of counting steps of said pulse counting means;
a frequency comparator having a first input terminal coupled to said pulse generating means to receive one of said first and second pulse trains and a second input terminal coupled to said pulse generating means to receive the other of said first and second pulse trains, the output of said frequency comparator being coupled to a second input terminal of said memory, said memory circuit initiating storage of the output of said pulse counting means when the frequencies of the first and second pulse trains applied to the first and second input terminals of said frequency comparator are equal; and
means for applying a starting pulse to said pulse counting means and said memory circuit for erasing the contents thereof.

11. Apparatus as defined by claim 10 which further comprises:
a programmable divider having a first input coupled to the output of said gate and a second input coupled to the output of said memory circuit;
a third counter coupled to the output of said programmable divider;
a multiplier having a first input coupled to the output of said third counter and a second input coupled to the output of said presettable first counter; and
a summer having a first input coupled to the output of said multiplier and a second input to the output of said pulse counting means, the output of said summer corresponding to the position of the tape on said first reel.

12. Apparatus as defined by claim 10 which further comprises:
a third counter having an input coupled to the output of said gate;
a dividing circuit having a dividend input coupled to the output of said third counter and a divisor input coupled to the output of said memory circuit;
a multiplier having a first input coupled to the output of said dividing circuit and a second input coupled to the output of said presettable first counter; and
a summer having a first input coupled to the output of said multiplier and a second input to the output of said pulse counting means, the output of said summer corresponding to the position of the tape wound on said first reel.

13. A method for measuring the position of a tape wound on first and second reels and movable therebetween, said reels being provided with means for generating first and second pulse trains having pulse repetition frequencies corresponding to the angular speeds of said first and second reels, respectively, comprising the steps of:
determining the ratio a of the pulse repetition frequency of said first pulse train to the pulse repetition frequency of said second pulse train when one of said reels has substantially no tape wound thereon;
determining the maximum total number of turns $N_{1ges}$ of tape on one of said reels when said reel is completely loaded;
counting the number of accumulated pulses $N_1$ in said first pulse train starting from the beginning of the winding of said tape on said first reel; and
computing the position L of said tape on said first reel from the formula $$L = k \cdot \left( N_1 + \frac{a-1}{2} \cdot \frac{N_1^2}{N_{1ges}} \right),$$

where k is a constant calibration factor.

14. The method defined by claim 13 wherein the ratio a and number of turns $N_{1ges}$ are determined for reels having hubs of equal diameters by a test run comprising the steps of:
winding all of said tape on said second reel;
beginning to wind the tape from said second reel to said first reel;
dividing the pulse repetition frequency of said first pulse train by the pulse repetition frequency of said second pulse train at the beginning of said winding operation to obtain the ratio a thereof;
continuing to wind the tape from said second reel to said first reel until the pulse repetition frequency of said first pulse train is equal to the pulse repetition frequency of said second pulse train, the winding of said tape being terminated at this point; and
counting the number of pulses in said first pulse train, said number being equal to one-half the number of turns $N_{1ges}$.

* * * * *